United States Patent
Kitagawa et al.

(10) Patent No.: US 6,863,720 B2
(45) Date of Patent: Mar. 8, 2005

(54) THERMOSENSITIVE COLOR-CHANGING DRY OFFSET INK AND A PRINTED MATERIAL USING THE SAME

(75) Inventors: Yosuke Kitagawa, Otsu (JP); Shozo Suefuku, Otsu (JP); Masaki Kariya, Kyoto (JP)

(73) Assignee: Matsui Shikiso Chemical Co., Ltd., Kyoto (JP)

( * ) Notice: Subject to any disclaimer, the term of this patent is extended or adjusted under 35 U.S.C. 154(b) by 0 days.

(21) Appl. No.: 10/164,201

(22) Filed: Jun. 6, 2002

(65) Prior Publication Data

US 2002/0185035 A1 Dec. 12, 2002

(30) Foreign Application Priority Data

Jun. 8, 2001 (JP) ........................................ 2001-173512

(51) Int. Cl.[7] ............................................... C09D 11/02
(52) U.S. Cl. ............................... 106/31.32; 106/31.33; 106/31.64; 106/31.65
(58) Field of Search ........................... 106/31.32, 31.33, 106/31.64, 31.65; 101/35, 36, 37, 38, 39, 40, 41, 42, 43, 44, 491

(56) References Cited

U.S. PATENT DOCUMENTS

2001/0032559 A1 * 10/2001 Price et al. .............. 101/350.1
2002/0121218 A1 * 9/2002 Senga et al. ............. 106/31.16

FOREIGN PATENT DOCUMENTS

| JP | 07-106962 | | 4/1995 | .......... C09D/11/02 |
| JP | 08277373 A | * | 10/1996 | .......... C09D/11/02 |
| JP | 11-020323 | | 1/1999 | .......... C09D/11/02 |
| WO | WO 9306942 A1 | * | 4/1993 | .......... B05D/31/28 |

OTHER PUBLICATIONS

Derwent English Translation of JP 8–277373, Oct. 1996, abstract.*

* cited by examiner

Primary Examiner—Mark L. Bell
Assistant Examiner—Veronica F. Faison
(74) Attorney, Agent, or Firm—L.C. Begein & Associates, PLLC

(57) ABSTRACT

The problem is to provide a thermosensitive color-changing dry offset ink, having no problem in an ink transferability and an excellent printing characteristics. As a thermosensitive color-changing dry offset ink is used one composed of thermosensitive, color-changing microcapsules mixed in a vehicle the capsule having two particle size characteristics of (1) particle size distribution: particles of less than 0.5 $\mu$m are contained in not less than 10 volume % and those not larger than 3.0 $\mu$m are contained in not less than 90 volume % and (2) mean particle diameter: 0.2–1.5 $\mu$m.

13 Claims, No Drawings

THERMOSENSITIVE COLOR-CHANGING DRY OFFSET INK AND A PRINTED MATERIAL USING THE SAME

DETAILED DESCRIPTION OF THE INVENTION

1. Technical Field

The invention relates to a thermosensitive color-changing dry offset ink and a printed material using said ink.

2. Background Art

Conventionally, ink dispersed in a vehicle by thermosensitive color-changing microcapsules is used in screen printing as well as gravure printing, flexographic printing, etc. In the meantime, a trial to use the capsules for an offset printing ink made the capsules aggregate and did not give a stable and uniform printing effects due to the results that an ink transferability between rolls, which is peculiar to a offset printing machine, is extremely bad owing to its coarseness of the mean diameter of said capsule, making transferability of the capsules with a temperature-sensitive color change property worse when raising a printing speed, and vehicle components pass between the rolls preferentially.

Therefore, as an offset printing it was only possible to the extent that a slow speed sheet printing was, and a high speed offset printing was impossible.

As a method to solve this problem known respectively are the methods, 1) by JP, A, 8-277373, a method characterized in that, in ink consisting of a thermochromic pigment and a dry offset ink medium, the thermochromic pigment in a range of 0.5 $\mu$m–5.0 $\mu$m of the particle size distribution occupying not less than 90 volume % of the total thermochromic pigment, that of the mean particle diameter 1.0–4.0 $\mu$m is dispersed in the vehicle, and 2) by JP, A, 2000-212489, a method using a pigment in a microcapsule form of a non-circular section shape wherein in ink dispersed with a thermochromic pigment in a medium for a dry offset ink said thermochromic pigment contains a thermochromic material in microcapsules and the mean particle diameter of the thermochromic pigment is in a range of 1.0–5.0 $\mu$m.

However, in these methods because of the mix of large particles (not less than 3 $\mu$m) of the thermochromic pigments in a large amount, the transferability of ink is bad and a problem of reduction in a printing characteristics is not avoidable.

Further, although in the above method 2) the transferability of ink can be improved making the capsule form a non-circular section shape, even adopting such a improving method it is not changed that large particles (not less than 3 $\mu$m) of the thermochromic pigments mix in a large amount, and therefore a problem of reduction in a printing characteristics is not avoidable.

Consequently, the present situation is that to date a thermochromic (with a temperature-sensitive color change property) dry offset ink, having no problem in ink transferability and an excellent printing characteristics has not yet existed.

Problem to be Solved by the Invention

The invention has an object to provide a thermosensitive color-changing dry offset ink, having no problem in an ink transferability and an excellent printing characteristics Means for Solving Problem As a result of an intensive studies to solve the above problems, the inventors found that owing to 2–3 g/m² (thickness: 2–3 $\mu$m) of a MAX transfer amount in a usual dry offset ink, the presence of a large amount of thicker, that is, not less than 3 $\mu$m particles extremely reduced ink transferability and printing characteristics became bad. Therefore, research was continued to fine a particle size of thermosensitive color-changing microcapsules to not more than 3 $\mu$m, and as the result the invention was accomplished Namely, the invention consists of the following constitutions.

1) A thermosensitive color-changing dry offset ink composed of thermosensitive color-changing microcapsules as an active ingredient mixed in a vehicle, the microcapsules having two particle size characteristics of (1) particle size distribution: particles smaller than 0.5 $\mu$m are contained in not less than 10 volume % and those not larger than 3.0 $\mu$m are contained in not less than 90 volume % and (2) mean particle diameter: 0.2–1.5 $\mu$m.

2) A thermosensitive color-changing dry offset ink according to 1) above, characterized in that the thermosensitive color-changing microcapsules are mixed in the vehicle at 5–40 weight %.

3) A dry offset printed material according to 1) or 2) above, wherein the dry offset ink with a temperature-sensitive color change property is printed.

4) The dry offset printed material according to 3) above, wherein the dry offset printed material is a container, a platy material or a film or a laminate thereof.

5) The dry offset printed material according to 4) above, wherein the container is a 2-piece can, a 3-piece can, a bottle, a drink box, or a jar.

6) The dry offset printed material according to 4) above, wherein the platy material is nonwoven fabric, paper, foil, a board, or a sheet.

The invention is made on the basis of a finding that owing to 2–3 g/m² (thickness: 2–3 $\mu$m) of a transfer amount in a dry offset ink, thermosensitive color-changing microcapsules having a particle size not less than 3 $\mu$m is made not to exist in not less than 10 volume %, resulting to obtain ink with an excellent printing characteristics.

A particle diameter of microcapsules used for a thermosensitive color-changing dry offset ink in the invention has two particle size characteristics, (1) particle size distribution: particles of less than 0.5 $\mu$m are not less than 10 volume % and moreover those not less than 3 $\mu$m are not less than 90 volume % and (2) mean particle diameter: 0.2–1.5 $\mu$m, whereby ink blended with said microcapsules is good in transferability, resulting in a high printing concentration, a smooth printing surface, stability of microcapsules on a printing machine without aggregation, and also no occurrence of misting (ink scattering phenomenon), and therefore a high speed printing, with which the object of the invention has been successfully accomplished.

The reason why the invention has the above excellent printing characteristics is in the point that the invention uses particles with a smaller size compared with a conventional method, though results to add an idea for a microcapsulation method of thermosensitive color-changing microcapsules and post-treatment make it possible.

Namely, although the microcapsulation of a composition with a temperature-sensitive color change property is obtained by making said composition emulsify or disperse in an aqueous medium to give a desired particle diameter, followed by addition of a resin to make a microcapsule wall membrane and hardening (cross-linking) it, in that case it is known as seen in the above prior example 1) (JP, A, 8-277373) that in order to fine the particle diameter an aqueous polymer, an aqueous cellulose type derivative, an aqueous protein, a surfactant, an emulsifier or the like are used.

Although it is considered that the above each additive acts as a protective colloidal material, said protective colloidal agent should be removed after the completion of microcapsulation, otherwise fine microcapsules for the aimed dry offset ink with a temperature-sensitive color change property is not obtained.

It is because residue of the protective colloidal agent produces bad effects such as absorbing water in ink, making particles gather in a dry powder operation of microcapsules and making them aggregate to a giant mass.

Consequently, although the problem is how to separate said protective colloidal agent from fine microcapsule particles after the end of microcapsulation, it was impossible that in a usual filtration procedure suspension particles of not more than 3 $\mu$m were separated from the protective colloidal agent, washed and purified.

Therefore, the inventors made an extensive research to obtain said fine thermosensitive color-changing microcapsules which do not contain a protective colloidal agent, and as the result found that said composition was finely emulsified or dispersed using a specific aqueous protective colloidal agent wherein the water swelling property is reduced in an acidic area of pH 1.0–4.0, followed by hardening (cross-linking) of a resin which becomes a microcapsule wall membrane and then by adjusting the water swelling property of said protective colloidal agent at the same pH area to easily remove the problematic protective colloidal agent by filtration and washing.

Based on these findings, the invention has succeeded to obtain fine microcapsule powder having two particle size characteristics that in a particle size distribution, the aimed particles of less than 0.5 $\mu$m is not less than 10 volume % and those of not more than 3.0 $\mu$m is not less than 90 volume %, and mean particle diameter is 0.2–1.5 $\mu$m, and to obtain a dry offset ink with an excellent temperature-sensitive color change property.

In the following explained are the requirements to constitute the characteristics of the invention.

(1) Thermosensitive Color-changing Composition

The composition changes its colors depending on the temperature, and such color change may be reversible or irreversible. Also, in the reversible one included is semi-reversible one accompanying a hysteresis in a color change behavior when temperature rises or falls.

Illustrative of a general composition in the present compositions are, for example, a two-component type composition consisting of a leuco pigment known as a pigment for a pressure-, or heat-sensitive copy paper, including a triphenylmethane phthalide, fluorane, phenothiazine, indolylphthalide, leucoauramine, spiropyran, spirooxazine, rhodaminlactam, triphenylmethane, diarylphtharide, triazene, spirophthalane, xanthene, naphtholactam, azomethine types, or the like, and of an organic developer known as a developer for the pressure-, or heat-sensitive copy paper, including a triazole, phenol, bisphenol, aromatic carboxylic acid, aliphatic carboxylic acid, thiourea or phosphoric acid types, or their esters or their metal salts, or a three components type composition which is made by adding further an organic medium such as an ester, alcohol, ether, ketone, carboxylic acid, azomethine, aromatic hydrocarbon or aliphatic hydrocarbon types to said two components type composition, and a liquid crystal composition or the like, though it is not limited only thereto.

(2) Thermosensitive Color-changing Microcapsules

Thermosensitive color-changing microcapsules of the invention have two particle size characteristics, (1) particle size distribution: particles of smaller than 0.5 $\mu$m is not less than 10 volume % and those of not larger than 3.0 $\mu$m is not less than 90 volume % and (2) mean particle diameter: 0.2–1.5 $\mu$m, and are the basis of the invention.

Namely, as to thermosensitive color-changing microcapsules of the invention, a thermosensitive color-changing composition is emulsified or dispersed in a specific protective colloidal solution into fine particle diameter as described above, then added with a resin which becomes a wall membrane, followed by heat hardening, and then pH of said dispersion liquid is made in a acidic area of 1.0–4.0 to adjust the water swelling property of a protective colloidal agent, filtered, and washed to remove said protective colloidal agent, followed by drying to obtain fine microcapsules appropriate for the invention.

As the protective colloidal agent used is one which is dissolved stably at neutral to alkaline area of pH and has a protective colloidal effect, whereby it reduces a swelling ratio at an acidic area of pH 1.0–4.0 and does not show the protective colloidal effect.

Specifically, illustrative are a styrene-maleic anhydride copolymer, ethylene-maleic anhydride copolymer, isobutylene-maleic anhydride copolymer, methylvinyl ether-maleic anhydride copolymer, aqueous acrylic acid resins, aqueous methacrylic acid resins or the like. However, it is not limited thereto, and each of these markedly reduces the high water swelling property in a range of pH 1.0–4.0.

In the invention it is necessary to make pH of the dispersion liquid at an acidic area of 1.0–4.0 in order to remove the protective colloidal agent. In an area of pH not less than 4.0, a water swelling property of the protective colloidal agent is not sufficiently reduced, and fine thermosensitive color-changing microcapsules can hardly be filtered and washed. On the other hand, in an area of pH not more than 1.0, said protective colloidal agent becomes insoluble and its aggregate, resulting in the mix of the aggregate in obtained thermosensitive color-changing microcapsules even if filtration and washing is made, whereby a obtained dry offset ink gives a problem of water-resistance or a big difficulty on a printing characteristics by a coarse aggregate.

Namely, in order to reduce the water swelling property of said protective colloidal agent in the invention, to make filtration and washing easy and to obtain the aimed fine microcapsules, the treatment at pH 1.0–4.0 is required.

Further, illustrative of microcapsulation methods of the microcapsules of the invention are the conventionally known methods, for example, such as a coacervation, interfacial polymerization, in situ polymerization, submerged hard coating, air-suspension coating or spray drying methods. However, it is not limited thereto, and a combination of two or more different methods can be used.

Illustrative of microcapsule wall materials are, for example, polyamine and a carbonyl compound to form a polyurea wall membrane, a polybasic acid chloride and polyamine to form a polyamide wall membrane, polyisocyanate and a polyol compound to form a polyurethane wall membrane, an epoxy compound and polyamine to form an epoxy resin wall membrane, melamine-formalin prepolymer methylolated melamine prepolymer, methylated methylolmelamine prepolymer, methylated melamine prepolymer to form a melamine resin wall membrane, urea-formalin prepolymer to form a urea resin wall membrane, phenol resin prepolymer to form a phenol resin wall membrane, each kind of monomer such as vinyl acetate, styrene, methacrylate, acrylonitrile or vinylidene chloride to form a vinyl type wall membrane, furthermore, gelatin, arabic gum, ethyl cellulose, polyvinyl alcohol, carboxymeyhyl cellulose or the like, though it is not limited thereto and a combination of two or more materials can be used.

Further, after the primary microcapsule wall membrane is formed, in order to increase the strength with this microcapsule that of a double wall membrane, in which the wall membrane is again coated and hardened, can be used.

Also, as a method to adjust the above particle diameter, this being the aim of the invention, for example, can be cited the following methods, though without removing a protective colloidal agent used for emulsification and dispersion after a microcapsule wall membrane formation, that is, the essential condition, they can not be attained, and each kind of method can only be used by the removal.

Namely, microcapsules with an aimed particle size can be obtained by adjusting concentration of the protective colloidal agent, adjusting speed of a stirring machine, changing a wing form of the stirring machine, adjusting temperature, adjusting concentration of thermosensitive color-changing composition, or adjusting a use ratio between thermosensitive color-changing composition and a microcapsule wall membrane component. Furthermore, in the case that only adjusting various conditions at the time of microcapsule preparation as described above is not sufficient, a desired particle size can also be arranged, if necessary, by filtered fractionation with a filter or by fractionation with a centrifuge method after finishing the capsulation.

Although a drying method of the obtained microcapsule-water dispersion liquid is not particularly limited, the aimed fine powder form microcapsule can also be obtained by drying with a hot wind drier after usual filtration, drying with a spray drying method or the like.

Further, a microcapsule shape of the invention is not limited as far as its particle diameter is in the same range, and can be a perfectly round shape, an indeterminate core/wall structure or a solid solution structure, and it can be a multilayer structure in which these are doubly coated further with a wall membrane resin. Furthermore, even if said form is primary particles of mononucleus or secondary aggregates of a multinuclear form produced by their aggregation, either one can be comprised.

(3) Vehicle for Dry Offset Ink with a Temperature-sensitive Color Change Property As the vehicle any of the conventionally known vehicle for dry offset ink can preferably be used with no limitation.

In the following, although the examples are illustrated, it is not limited only thereto.

As a resin used in the vehicle, all resins which can be varnish-like become a target, whichever they are a natural resin or a synthetic resin. For example, oil free alkyd resin, fatty acid denaturant alkyd resin, nondrying oil alkyd resin, semidrying oil alkyd resin, drying oil alkyd resin, acid hardening aminoalkyd resin, rosin denaturant alkyd resin, phenol denaturant alkyd resin, rosin denaturant phenol resin, rosin denaturant maleic acid resin, urethane denaturant alkyd resin, acryl denaturant alkyd resin, styrene denaturant alkyd resin, epoxy denaturant alkyd resin, oil free polyester resin, acryl resin, polyester resin, epoxy resin, urethane resin, acrylpolyol resin, etc., can be cited, though it is not limited thereto.

These resins can be used each independently or in a combination of two or more species.

Further, these resins, if desired, can optionally be crosslinked with butylated melamine resin, methylolmelamine resin, methylated melamine resin, methylated methylolmelamine resin, benzoguanamine resin, isocyanate resin, denaturant epoxy resin, butylated urea resin, butylated urea melamine resin, or the like, isocyanate type, epoxy type, ethyleneimine, oxazoli type, silane coupling agent, titanium coupling agent, acid, metal dryer, or the like.

Also, according to the dissolving power of drying oil and said resin, as solvent used for the vehicle, solvent such as an aliphatic hydrocarbon type, aromatic hydrocarbon type, alcohol type, ether type, glycol type, ester type, ketone type, water, or the like can optionally be selected and used. However, while there is no reason why it is limited to these solvents, any one species of solvent alone or an optional mix of two or more species can be used, and even no solvent is possible.

Further, although the above vehicle for dry offset ink is mainly a heat hardening type (heat hardening and solvent evaporation heat hardening types), the vehicle used in the invention is not limited to this type, and an air oxidation polymer type material wherein a metal dryer is mixed with the above resin, or an ultraviolet hardening type material, or an electron beam hardening type material as described below, or the like can be used.

This type of vehicle is usually constituted by polymerization components such as 1) reactive monomer, reactive oligomer, reactive prepolymer or reactive polymer which are polymerizable by a radical reaction due to ultraviolet light or electron beam, and additive components such as 2) a photopolymerization initiator, an intensifier, a polymerization inhibitor, or a stabilizer which generates a radical. Examples are cited in the following.

(1) Polymerization Component

Illustrative are denaturant products of each kind such as oligomers, prepolymers, polymers and ethleneoxide additives thereof, including urethane (meth)acrylate, epoxy (meth) acrylate, polyester(ether) (meth)acrylate, oligoesteracrylate, unsaturated polyester, butadiene type (meth)acrylate, polyol acrylate and melamine acrylate; alkylacrylates such as methyl, ethyl, butyl, 2-ethylhexyl, lauryl and stearyl; cyclic acrylates such as isobornyl and cyclohexyl; acrylates having a hydroxyl group; acrylates having a carboxyl group; acrylates having an amino group; acrylates having a phosphoric acid group; N-vinylpyrrolidone; acrylamide; N-methylolacrylamide; each kind of monofunctional monomers such as acryloyl morpholine and diacrylates such as butanediol, diethyleneglycol, hexanediol, neopentyl glycol and nonanediol; triacrylates such as trimethylolpropane and glycerin pentaerythritol; tetraacrylates such as pentaerythritol and ditrimethylolpropane; pentaacrylates or hexaacrylates of dipentaerythritol; glycidyl methacrylate-acrylic acid adduct; and each kind of polyfunctional monomers such as methylene bisacrylamide. (In the above description acrylate also includes methacrylate.)

(2) Additive Component

Illustrative are photopolymerization initiators such as an acetophenone, benzophenone, benzoin ether, thioxanthone, acylphosphineoxide or α-acyloxime ester types; sensitizers such as N-methyldiethanolamine, Michler's ketone, 4-diethyaminoethyl benzoate or 4-dimethyaminoisoamyl benzoate; polymerization inhibitors such as hydroquinone or methoquinone; other stabilizers, etc.

(4) Additive

Each kind of additives can be contained in a composition with a temperature-sensitive color change property in microcapsules or in a vehicle for dry offset ink.

Illustrative of these additives are surfactants, dispersing agents, plasticizers, anti-foaming agents, wax, antistatic agents, dry adjusting agents, UV absorbing agents, antioxidants, photostabilizes, reactive hardening agents, chelating agents, nonpolymeric polymer, thixotropy donating agents, leveling agents, adhesion donating agents, crosslinking agents, organic pigments, inorganic pigments, fluorescent pigments, phosphorescent pigments, pearl pigments, metallic pigments, gold powder, silver powder, glass powder, dyes, fluorescent dyes, fluorescent whitening agents, electrochromic agents, UV phosphorescent dyestuffs, extenders, fillers, fire retardance agents, fire preventive agents, deodorizing agents, antimicrobials, antiseptics, fungicides, evasion agents, flavorings, photocatalysts, slip additives, drip-stop agents, organic foaming agents, capsule foaming agents, or the like, though they are not limited only thereto.

(5) Thermosensitive Color-changing Dry Offset Ink

The dry offset ink with a temperature-sensitive color change property of the invention can be obtained dispersing microcapsules with the temperature-sensitive color change property of the above (2) into the vehicle for dry offset ink of the above (3).

Thermosensitive color-changing dry offset ink of the invention can appropriately be prepared by blending thermosensitive color-changing microcapsule particles of 0.5–50 weight parts, preferably 5–40 weight parts, with a vehicle for offset ink of 100 weight parts.

In this case, said microcapsule particles can be blended mixing two or more different species.

(6) Dry Offset Printing (Printing Method)

By way of the thermosensitive color-changing dry offset ink of the invention, an unprecedentedly high speed printing becomes possible by fining microcapsules as described above, and an extremely clear, good in transferability, and moreover sharp printing becomes possible, for example, at a speed of not less than 1,500 cans/min by a dry offset printing machine to print 2-piece cans and not less than 8,000 sheets/hour by a dry offset printing machine to print sheet papers or films.

Additionally, the thermosensitive color-changing dry offset ink of the invention is good in ink stability, and thermosensitive color-changing microcapsules are not destroyed, for example, in a long run printing to 2-piece cans of 1,000,000 pieces or papers of 50,000 sheets. Also, after the end of the above long run printing, there is no aggregation and accumulation of the thermosensitive color-changing microcapsules on ink kneading rolls of a printing machine, and stable printing is possible.

These facts clearly show how the thermosensitive color-changing microcapsules of the invention is excellent in stability and transferability of ink.

(Printed Material)

The present thermosensitive color-changing dry offset ink can be applied to any conventionally known dry offset printing method, and any kind of printing object is also available for printing if it is a printing object which is conventionally printed by dry offset.

As for a printing object, metal such as aluminum or steel, paper, synthetic paper, coating paper, laminate paper, plastic film, aluminum foil, metal foil, board, wood, glass, ceramic, pottery, or the like can be applied as a material, and as a form can be printed 2-piece cans, 3-piece cans, new bottle cans or the like containing beer, juice, tea, liquor, drinking water or the like, and plastic bottles, plastic containers, paper packs, glass bottles, glass containers or the like containing juice, tea, liquor, drinking water, food, cosmetic or the like, and further as a platy body can be cited a metal sheet such as aluminum, steel, or the like, paper plastic sheets or the like in a wide range, though they are not limited only thereto.

Thus, thermosensitive color-changing dry offset ink can be used for various kinds of dry offset printing methods, and types of its printing objects are also in a wide range, though it is most suitable for a side printing of aluminum cans, steel cans or plastic containers by a curved surface printing machine (2-piece can printing machine) which prints with an especially high-speed.

As an specific example, multicolor printing is carried out to an aluminum can coated with a base material color or beforehand with a white or pastel color paints to hide the base, using the thermosensitive color-changing dry offset ink alone or in a combination with a general ink of invariable tone and placing them in multiple units. A printed concentration can also be improved by placing the same color thermosensitive color-changing dry offset ink in 2–3 units and multiply printing.

Subsequently, although it is possible to warm directly a printed aluminum can and harden said ink, usually a top coating is given with such aims as protection of printed surface, donation of gloss or increase of light resistance, and then hardened to obtain an aluminum can having a temperature-sensitive color change property.

Illustrative of such top coating agents are usually those in which acrylic resin, polyester resin, epoxy resin, or the like are dissolved in solvent such as hydrocarbon, alcohol, glycol or water, and amino resin, isocyanate resin, amine resin or the like are blended as a hardening agent, though it is not limited only thereto. Containers or platy bodies printed by offset printing of the invention show various kinds of functions by a function of a temperature-sensitive color changing property of the thermosensitive color-changing composition in microcapsules, and therefore the added value becomes extremely high. For example, it is possible to give a different pattern and to give various kinds of danger marks or optimum temperature marks, or to use for security, giving printed materials for containers, platy materials, films or laminates thereof, or the like which have characteristics of an excellent design, unexpectedness, information, etc.

MODES OF CARRYING OUT THE INVENTION

In the following, the invention will be illustrated in more detail by way of examples, but the invention is not limited thereto.

In the following, "part" and "%" mean "weight part" and "% by weight".

EXAMPLE 1

(Formation of Thermosensitive Color-changing Microcapsules)

First, 3-dimethylamino-6-methyl-7-chlorofluorane (2 parts), bisphenol A (5 parts), lauryl palmitate (10 parts), cetyl alcohol (10 parts) and epoxy resin (30 parts, Epikote 828: manufactured by Yuka Shell Co., Ltd.) were added into a glass beaker of 200 ml, warmed to 100° C. and dissolved to prepare a thermosensitive color-changing solution.

Subsequently, 10% styrene/maleic acid resin (400 parts, SMA 1000: Alco Chemical Company) as a protective colloidal agent, which was neutralized and dissolved by NaOH, was added in a glass beaker of 1 liter and warmed to 95–100° C., and then the obtained solution was stirred by a stirring machine, slowly added with the above thermosensitive color-changing to adjust mean particle diameter of oil droplet to 0.7 $\mu$m under microscope by adjustment of a stirring speed. After adjustment, amine type hardening agent (5 parts, Epikure U: manufactured by Yuka Shell Co., Ltd.) as a capsule membrane agent was slowly added under stirring, reacted for 5 hours to form microcapsules with epoxy wall membrane, having the temperature-sensitive color change property.

Subsequently, the obtained microcapsule thermosensitive color-changing was added with 5% sulfuric acid to adjust pH to 2.8, lowering the water swelling property of the protective colloidal agent used in emulsification to give the functional reduction. Then, filtration was carried out by using a filter-press machine to give thermosensitive color-changing, having water content ratio of 38%.

The obtained thermosensitive color-changing, having water content ratio of 38% (90 parts) was added with water (400 parts), warmed to 95–100° C. under stirring, then added with block isocyanate (10 parts, Prominate XC-910: manufactured by Takeda Chemical Co., Ltd.) and reacted for 4 hours. Epoxy resin wall membrane of said thermosensitive color-changing was hardened with isocyanate to improve further the hardening density as well as to insolubilize the protective colloidal agent by hardening which remained only little. Subsequently, it was filtered by a filter-press to give thermosensitive color-changing, having water content ratio of 37%. Further, it was diluted with 10 times of water and dried by a spray drier method to give microcapsules of powder form, having the temperature-sensitive color change property.

(Preparation of Dry Offset Ink)

The above microcapsules of powder form (35 parts), having the temperature-sensitive color change property and UV hardening type ink (60 parts, Kayarad R-381: manufacture by Nihon Kayaku Co., Ltd.), N-vinylpyrrolidone (5 parts) and general yellow pigment (0.5 parts, PV yellow H-10G: manufacture by Clariant Co., Ltd.) were kneaded using a stirring machine, followed by dispersion by a roll mill to obtain the aimed UV hardening type dry offset ink with the temperature-sensitive color change property.

The obtained microcapsules with the temperature-sensitive color change property in said ink kept resistance toward a roll mill, and there was no concentration change between before and after passage through the roll mill.

Further, the microcapsules with the temperature-sensitive color change property after passage through the roll mill was completely dispersed as primary particles, and the particle diameter was measured by a particle size distribution apparatus (LA-700 manufactured by Horiba Seisaku-sho, Co., Ltd.) to show the mean particle diameter: 0.687 µm, particle size distribution: not larger than 3.0 µm, 100 volume %, and smaller than 0.5 µm, 30 volume %.

(Printing)

In the case that a flower pattern was printed on paper with the above dry offset ink with the temperature-sensitive color change property at a speed of 8,000 sheets/hour using a sheet dry offset printing machine, a printed material was obtained in which the flower pattern is reversibly changed by heat, showing orange at not more than 24° C. and yellow at not less than 32° C.

The obtained printed surface was smooth, and moreover the stability of ink on the machine was good, giving stable printed materials in which there was no difference among first, ten thousandth and fifty thousandth sheets of printed materials. That is, in a long-run printing of 50,000 sheets microcapsules with the temperature-sensitive color change property were not destroyed, showing that stable printed materials can be obtained.

Further, when the kneading roll was ascertained after printing 50,000 sheets, there was no aggregation of the microcapsules with the temperature-sensitive color change property and no abnormal residue, showing an excellent ink transferability.

EXAMPLE 2

(Formation of Thermosensitive Color-changing Microcapsules)

First, 3,3-bis(p-dimethylaminophenyl)-6-dimethylaminophtharide (2 parts), bisphenol A (5 parts), decyl laurate (10 parts) and stearyl alcohol (10 parts) were added into a glass beaker of 200 ml, warmed to 100° C. and dissolved to prepare solution with a temperature-sensitive color change property.

Subsequently, 10% methyl vinyl ether maleic anhydride copolymer resin (400 parts, GANTREZ AN-179: manufactured by GAF CHEMICALS) neutralized and dissolved by NaOH, was added in a glass beaker of 1 liter and warmed to 95–100° C. The obtained solution in the 1-liter container was stirred, slowly added with the above thermosensitive color-changing solution and emulsified, followed by adjusting mean particle diameter of oil droplet to 0.5 µm adjusting the speed of a stirring machine.

After adjustment, 50% aqueous methylolmelamine solution (200 parts) as a capsule membrane agent was slowly added under continued stirring, heated for 4 hours to form thermochromic microcapsules.

Subsequently, the obtained microcapsule solution was added with 5% sulfuric acid to adjust pH to 2.5, adjusting the water swelling property of the protective colloidal agent used in emulsification. To obtained solution was dehydrated by using a filter-press machine. The obtained thermosensitive color-changing microcapsules, having water content ratio of 36%, was diluted 10 times with water and dried by a spray drier method to give the thermosensitive color-changing microcapsules in a powder form.

(Preparation of Dry Offset Ink)

The above thermosensitive color-changing microcapsules in a powder form (30 parts), were added into a vehicle consisting of fatty acid denaturant alkyd resin (40 parts, A-27 resin: Dainippon Ink and Chemicals Incorporated) and hydrocarbon solvent (30 parts, alkylbenzene: b.p. 280–320° C.) and kneaded using a stirring machine, followed by dispersion by a roll mill to obtain the aimed thermochromic dry offset ink.

Particle size distribution of the obtained thermosensitive color-changing microcapsules was measured by a particle size distribution apparatus (LA-700 manufactured by Horiba Seisaku-sho, Co., Ltd.) to show mean particle diameter: 0.486 µm, particle size distribution: smaller than 0.5 µm (51 volume %), 0.07 µm–2.0 µm (100 volume %).

(Printing)

The above obtained thermosensitive color-changing dry offset ink was used for printing on aluminum cans at the speed of 2,000 cans /min using a dry offset printing machine for 2-piece can, and on the total surface was carried out a protective coating treatment consisting of polyester resin (20 parts), butylated melamine resin (15 parts), hydrocarbon solvent (65 parts) and butyl cellosolve (5 parts), followed by heat treatment at 220° C. for 60 sec to harden said ink and the protective coating agent.

The result revealed that M mark was smoothly printed on aluminum cans, and even in a long-run printing of 1,000,000 pieces there was no aggregation of microcapsule particles in the ink and no misting, and that it was ink with extremely good stability on machine, giving a stable printed material. As for adhesive strength such as scratch strength and tape stripping strength no problem was observed.

Further, water was poured into the obtained aluminum can and stored in a refrigerator for 1 hour, whereby the M mark printed on the aluminum can was changed to blue, which is the indication that the cold drink was at its best for use. Further, measurement of the temperature of the cooling water at that time was shown to be 6° C.

EXAMPLE 3

(Formation of Thermosensitive Color-changing Microcapsules)

The same as the example 2.

(Preparation of Dry Offset Ink)

The powder-form thermosensitive color-changing microcapsules (35 parts) obtained in the example 2 was added into a vehicle consisting of oil free polyester resin (35 parts, A-44 resin: Dainippon Ink Chemical Industries Co., Ltd.), methylated melamine resin (10 parts, Cymel 303: Mithui Toatsu Kagaku, Co.,Ltd.) and polyethlene glycol (20 parts, P-400: Asahi Denka Kogyo, Co., Ltd.) and kneaded using a stirring machine, followed by dispersion with a roll mill to obtain the aimed aqueous dry offset ink with the temperature-sensitive color change property.

The particle size distribution of the microcapsules with the temperature-sensitive color change property in the obtained ink was particle diameter: 0.501 $\mu$m, and particle size distribution: smaller than 0.5 $\mu$m (49 volume %), 0.07 $\mu$m–2.0 $\mu$m (100 volume %).

(Printing)

The above obtained dry offset ink with the temperature-sensitive color change property was used for printing on aluminum cans at the speed of 1,500 cans/min using a dry offset printing machine for 2-piece can, and on the total surface was treated an aqueous protective coating agent consisting of polyester resin (20 parts), methylated melamine resin (15 parts), water (50 parts), butyl cellosolve (14 parts) and UV absorbing agent (1 part), followed by heat treatment at 230° C. for 60 sec to harden said ink and the protective coating agent.

The result revealed that M mark was smoothly printed on aluminum cans as similar as the example 1, and the ink stability on machine was extremely good, giving a stable printed material with no misting, in which no problem was observed on adhesive strength such as scratch strength and tape stripping strength.

Further, water was poured into the obtained aluminum can and stored in a refrigerator for 1 hour, whereby the M mark printed on the aluminum can was changed to blue, which is the indication that the cold drink was at its best for use. Further, measurement of the temperature of the cooling water at that time was shown to be 6° C.

EXAMPLE 4

(Formation of Thermosensitive Color-changing Microcapsules)

First, 3-diethylamino-7,8-benzofluorane (2 parts), bisphenol A (5 parts), behenyl alcohol (20 parts), UV absorbing agent (2 parts, Tinuvin 326: Ciba Specialty Chemicals, Co.,Ltd.) and epoxy resin (30 parts, Epikote 828: manufactured by Yuka Shell Co., Ltd.) were added into a glass beaker of 200 ml, warmed to 100° C. and dissolved to prepare a thermosensitive color-changing solution.

Subsequently, 10% ethylene/maleic acid copolymer resin (400 parts, EMA-31: Monsanto Co., Ltd.) as a protective colloidal agent, which was neutralized and dissolved by NaOH, was added in a glass beaker of 1 liter and warmed to 95–100° C. The obtained solution was slowly added with the above thermosensitive color-changing solution under stirring, and emulsified, followed by adjusting mean particle diameter of oil droplet to 0.6 $\mu$m by adjusting the stirring speed of a stirring machine.

After adjustment, amine compound (5 parts, Epikure U: manufactured by Yuka Shell Co., Ltd.) was slowly added dropwise under stirring, reacted for 5 hours to form thermosensitive color-changing microcapsules including the component with the temperature-sensitive color change property, in which the wall membrane was the epoxy resin hardening membrane.

Subsequently, the obtained microcapsule solution with the temperature-sensitive color change property was added with 5% sulfuric acid to adjust pH to 2.0, adjusting the water swelling property of ethylene/maleic acid, a protective colloidal agent, to reduce its function, giving a unstable dispersion system. Then, filtration was carried out by using a filter-press, followed by washing 2 times to give microcapsules with the temperature-sensitive color change property, having water content ratio of 40%.

Further, the obtained microcapsules with the temperature-sensitive color change property, having water content ratio of 40% (64 parts) was again added into a beaker of 1 liter, added with water (400 parts), then warmed to 95–100° C. The obtained solution was added dropwise with 50% methylolmelamine solution (20 parts) as a capsule membrane agent under stirring and reacted for 4 hours, followed by filtration to give microcapsules, with the temperature-sensitive color change property, including the thermosensitive color-changing component having water content ratio of 37% and, whose membranes were coated with epoxy resin and furthermore with melamine resin wall, that is, doubly coated. Subsequently, said obtained capsules with water content ratio of 37% (70 parts) was diluted with 10 times of water and dried by a spray drying machine to make microcapsules into a powder form.

(Preparation of Dry Offset Ink)

The obtained thermosensitive color-changing microcapsules of powder form (35 parts), were kneaded with rosin denaturant phenol resin (40 parts), linseed oil (15 parts), hydrocarbon solvent (10 parts, b.p.: 280–330° C.) and cobalt naphthenate (2 parts) using a stirring machine, followed by dispersion by a roll mill with three bars to obtain the aimed dry offset ink with the temperature-sensitive color change property.

Further, the microcapsules with the temperature-sensitive color change property in said ink were not effected by the load of a roll mill, and there was also no concentration change between before and after passage through the roll mill.

Also, the particle size distribution of the microcapsules with the temperature-sensitive color change property in said ink was measured by a particle size distribution apparatus, LA-700 manufactured by Horiba Seisaku-sho, to show mean particle diameter: 0.605 $\mu$m, particle size distribution: smaller than 0.5 $\mu$m (35 volume %), not larger than 3.0 $\mu$m (98 volume %), and it was found out that the microcapsules were distributed into the primary particles.

(Printing)

Polka dots were printed on art papers with the obtained dry offset ink of an oxidative polymerization type with the temperature-sensitive color change property at a speed of 6,000 sheets/hour using a sheet dry offset printing machine.

As for the obtained printed material, the surface was smooth, showed a pink color at not more than 55° C. and became colorless at not less than 65° C., giving the printed material in which the polka dots disappeared.

As for the stability of said ink on the machine, the first, six thousandth, ten thousandth and fifty thousandth sheets were ascertained, though there was no concentration variance and no difference in their smoothness, showing the stability. Further, as to the fit for a high speed printing there was no misting (ink scattering phenomenon), showing an excellent transferability.

COMPARATIVE EXAMPLE 1

Except that the particle diameter of oil droplet was adjusted to 1.4 μm to form a capsule membrane agent adjusting the speed of the stirring machine as in the example 2, thermosensitive color-changing microcapsule powder was prepared in completely the same way as that in the example 2 to give a dry offset ink with the temperature-sensitive color change property as same as that in the example 2.

Further, the particle sized distribution of the microcapsules with the temperature-sensitive color change property in said obtained ink showed particle diameter: 1.405 μm, and particle size distribution: not larger than 0.5 μm (10 volume %), 0.5 μm–3.0 μm (75 volume %), not smaller than 3.0 μm (15 volume %).

The obtained ink was printed on an aluminum can at the speed of 2,000 cans /min using a dry offset printing machine for 2-piece can, and the protective coating agent and heat treatments were applied in the same manner as those in the example 2 to give a thermosensitive color-changing M mark on the aluminum can.

The obtained M mark on the aluminum can spotted in the surface because of ink float and lack in smoothness, and moreover the printing concentration was reduced by about 30%.

Further, the stability of the obtained ink on the printing machine was bad, and after printing 100,000 pieces, a check was made on the kneading roll of the printing machine, indicating that the thermosensitive color-changing microcapsule particles of not smaller than 3.0 μm aggregated, gathered and laminated.

In the above comparative example 1 it is indicated that even if the mean particle diameter of thermosensitive color-changing microcapsules is not more than 1.5 μm, printing characteristics become bad in the case that those of not less than 3 μm are present in not less than 10 volume %.

COMPARATIVE EXAMPLE 2

Except that the particle diameter of oil droplet was adjusted to 2.0 μm to form a capsule membrane agent adjusting the speed of the stirring machine as in the example 2, thermosensitive color-changing microcapsule powder was prepared in completely the same way as that in the example 2 to give a dry offset ink with the temperature-sensitive color change property as same as that in the example 2.

Further, the particle size distribution of the microcapsules with the temperature-sensitive color change property in said obtained ink showed particle diameter: 2.103 μm, and particle size distribution: not larger than 0.5–2.0 μm (50 volume %), 2.0–5.0 μm (40 volume %), not smaller than 5.0 μm (10 volume %).

The obtained ink was printed on an aluminum can at the speed of 2,000 cans /min using a dry offset printing machine for 2-piece can, and the protective coating agent and heat treatments were applied in the same manner as those in the example 2 to give a thermosensitive color-changing M mark on the aluminum can.

The obtained M mark on the aluminum can was stronger in its ink float than that of the example 2, spotted in the surface and lacked in smoothness, and furthermore the printing concentration was reduced by about 50%.

Further, the stability of the obtained ink on the printing machine was worse than that of the example 2, and after printing 100,000 pieces a check was made of the kneading roll of the printing machine, indicating that the thermosensitive color-changing microcapsule particles of not less than 3.0 μm aggregated, gathered and laminated.

When comparing the initial printed material with that after 60 min, it is indicated that the concentration after 60 min became about 80% and moreover the smoothness was reduced.

In the result of the comparative example 2 it is indicated that printing characteristics become bad in the case that the mean particle diameter of thermosensitive color-changing microcapsules is not less than 1.5 μm and in the particle size distribution, those of smaller than 0.5 μm are in not more than 10 volume % and moreover those of smaller than 3.0 μm are in not less than 10 volume %.

COMPARATIVE EXAMPLE 3

After the formation of microcapsule membrane agent of a mean particle diameter 0.5 μm as in the example 2, filtration by a filter press was tested without the action reduction of the protective colloidal agent with acid.

The result showed that the protective colloidal agent fouled a filtration cloth of the filter-press and made filtration impossible.

In the above result of the comparative example 3, it is indicated that if the action function of a protective colloidal agent used in microcapsulation is not reduced by a pH control to adjust the water swelling property of the protective colloidal agent, the aimed microcapsules with the temperature-sensitive color change property can not be filtered.

Through the results of the above examples and comparative examples, it is ascertained that thermosensitive color-changing microcapsules which an effective component of a dry offset ink with the temperature-sensitive color change property are required to meet the two essential conditions of having two particle size characteristics; 1) mean particle size: 0.2–1.5 μm, 2) particle size distribution: those of smaller than 0.5 μm are not less than 10 volume % and moreover those of not larger than 3.0 μm are not less than 90 volume %.

Effect of the Invention

In the invention, by using a method for an action reduction of a protective colloidal agent used in microcapsulation as thermosensitive color-changing microcapsules, the adoption of those with a fine particle diameter has now become possible.

As the result, the transferability of ink when a dry offset printing has been improved, whereby the smoothness and stability of a printing surface is good and misting (ink scattering phenomenon) does not happen, and therefore not only a high speed printing has become possible, but a dry offset ink with temperature-sensitive color change property, having excellent printing characteristics of good water resistance of a printed material and a problem-free adhesive strength have become possible.

Further, its excellent printing characteristics exerts a remarkable effect that it is maintained in a long-run printing (not less than 1,000,000 pieces or 50,000 sheets).

What is claimed is:

1. A thermosensitive color-changing dry offset ink composed of thermosensitive color-changing microcapsules as an active ingredient mixed in a vehicle, the microcapsule having two particle size characteristics of (1) particle size distribution: particles smaller than 0.5 μm are contained in not less than 10 volume % and those not larger than 3.0 μm are contained in not less than 90 volume % and (2) mean particle diameter: 0.2–1.5 μm.

2. A thermosensitive color-changing dry offset ink according to claim 1, characterized in that thermosensitive color-changing microcapsules are mixed in the vehicle at 5–40 weight %.

3. A thermosensitive color-changing dry offset ink composed of thermosensitive color-changing microcapsules as an active ingredient mixed In a vehicle, the microcapsule having two particle size characteristic, of (1) particle size distribution: particles smaller than 0.5 μm are contained in not less than 10 volume % and those not larger than 3.0 μm are contained in not less than 90 volume % and (2) mean particle diameter: 0.2–1.5 μm,
wherein said thermosensitive color-changing microcapsule comprises at least a two-component composition comprising a leuco pigment selected from the group consisting of triphenylmethane phthalide, fluorine, phenothiazine indolylphthalide, leucoauramine spiropyran, spirooxazine, rhodaminlactam, triphenylmethane, diarylphtharide, triazene, spirophthalane, xanthene, naphtholactam, and azomethine types and, a developer selected from the group consisting of triazole, phenol, bisphenol, aromatic carboxylic acid, aliphatic carboxylic acid, thioururea, or phosphoric acid types, and esters or metal salts thereof.

4. The thermosensitive color-changing dry offset ink of claim 3 wherein the thermosensitive color-changing microcapsule further comprises a third component selected from the group consisting of esters, alcohols, ethers, ketones, carboxylic acid, azomethine, aromatic hydrocarbon, and aliphatic hydrocarbon types.

5. The thermosensitive color-changing dry offset ink according to claim 3, characterized in that thermosensitive color-changing microcapsules are mixed in the vehicle at 5–40 weight %.

6. A dry offset printed material comprising a thermosensitive color-changing dry offset ink composed of thermosensitive color-changing microcapsules as an active ingredient mixed in a vehicle, the microcapsules having two particle size characteristics of (1) particle size distribution: particles smaller than 0.5 μm are contained in not less than 10 Volume % and those not larger than 3.0 μm are contained in not less than 90 volume % and (2) mean particle diameter: 0.2–1.5 μm, wherein the dry offset ink with temperature-sensitive color change property is printed.

7. The dry offset printed material according to claim 6, wherein the dry offset printed material is a container, a platy material or a film or a laminate thereof.

8. The dry offset printed material according to claim 7, wherein the container is a 2-piece can, a 3-piece can, a bottle, drink box, or a jar.

9. The dry offset printed material according to claim 7, wherein the piety material is nonwoven fabric. paper, a board, foil, or a sheet.

10. A dry offset printed material comprising a thermosensitive color-changing dry offset ink composed of thermosensitive color-changing microcapsules as an active ingredient mixed in a vehicle, the microcapsule having two particle size characteristics of (1) particle size distribution: particles smaller than 0.5 μm are contained in not less than 10 volume % and those not larger than 3.0 μm are contained in not less than 90 volume % and (2) mean particle diameter: 0.2–1.5 μm, characterized in that thermosensitive color-changing microcapsules are mixed in the vehicle at 5–40 weight %.

11. The dry offset printed material according to claim 10, wherein the dry offset printed material is a container, a platy material or a film or a laminate thereof.

12. The dry offset printed material according to claim 11, wherein the container is a 2-piece can, a 3-piece can, a bottle, drink box, or a jar.

13. The dry offset printed material according to claim 11, wherein the platy material is nonwoven fabric, paper, a board, foil, or a sheet.

* * * * *